United States Patent
Yun et al.

(10) Patent No.: US 11,592,713 B2
(45) Date of Patent: Feb. 28, 2023

(54) LIQUID CRYSTAL ALIGNING AGENT COMPOSITION, METHOD FOR PREPARING LIQUID CRYSTAL ALIGNMENT FILM USING SAME, AND LIQUID CRYSTAL ALIGNMENT FILM AND LIQUID CRYSTAL DISPLAY DEVICE USING SAME

(71) Applicant: LG CHEM, LTD., Seoul (KR)

(72) Inventors: Hyeongseuk Yun, Daejeon (KR); Soonho Kwon, Daejeon (KR); Jung Ho Jo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 381 days.

(21) Appl. No.: 16/498,292

(22) PCT Filed: Jan. 8, 2019

(86) PCT No.: PCT/KR2019/000278
§ 371 (c)(1),
(2) Date: Sep. 26, 2019

(87) PCT Pub. No.: WO2019/139332
PCT Pub. Date: Jul. 18, 2019

(65) Prior Publication Data
US 2020/0392409 A1    Dec. 17, 2020

(30) Foreign Application Priority Data

Jan. 10, 2018  (KR) .................. 10-2018-0003580
Jan. 7, 2019   (KR) .................. 10-2019-0001975

(51) Int. Cl.
| | |
|---|---|
| *G02F 1/1337* | (2006.01) |
| *C09D 7/63* | (2018.01) |
| *C08G 73/10* | (2006.01) |
| *C08K 5/21* | (2006.01) |
| *C09D 179/08* | (2006.01) |
| *C09K 19/56* | (2006.01) |

(52) U.S. Cl.
CPC ... *G02F 1/133723* (2013.01); *C08G 73/1071* (2013.01); *C08G 73/1085* (2013.01); *C08K 5/21* (2013.01); *C09D 7/63* (2018.01); *C09D 179/08* (2013.01); *C09K 19/56* (2013.01); *G02F 1/13378* (2013.01); *C09K 2323/025* (2020.08)

(58) Field of Classification Search
CPC ............. C09K 19/56; C09K 2323/025; C09K 2323/027; C08G 73/1071; C08G 73/1085; C08K 5/21; C09D 179/08; G02F 1/133723; G02F 1/13378; C08L 79/08
See application file for complete search history.

(56) References Cited

U.S. PATENT DOCUMENTS

| | | | |
|---|---|---|---|
| 2015/0062513 A1 | 3/2015 | Park et al. | |
| 2018/0230384 A1 | 8/2018 | Jo et al. | |
| 2018/0298284 A1 | 10/2018 | Jo et al. | |
| 2018/0348578 A1 | 12/2018 | Jo et al. | |
| 2019/0058178 A1* | 2/2019 | Meador | ................ H01M 50/411 |

FOREIGN PATENT DOCUMENTS

| | | | | |
|---|---|---|---|---|
| CN | 102604653 A | | 7/2012 | |
| CN | 105038817 A | | 11/2015 | |
| CN | 106232733 A | | 12/2016 | |
| EP | 3575381 B1 * | | 12/2020 | ....... A61F 13/00063 |
| JP | 3738492 | | 1/2006 | |
| JP | 2012-150251 | | 8/2012 | |
| JP | 2015215591 A * | | 12/2015 | |
| JP | 2016-170409 A | | 9/2016 | |
| JP | 2017-106941 | | 6/2017 | |
| JP | 2017-138575 | | 8/2017 | |
| JP | 6812632 B2 * | | 1/2021 | ....... A61F 13/00063 |
| KR | 10-2012-0084253 | | 7/2012 | |
| KR | 10-2015-0025528 | | 3/2015 | |
| KR | 10-2017-0002391 | | 1/2017 | |
| KR | 10-2017-0114366 | | 10/2017 | |
| KR | 10-2017-0114366 A | | 10/2017 | |
| KR | 10-2017-0127966 | | 11/2017 | |
| KR | 10-2017-0143365 | | 12/2017 | |
| KR | 10-2018-0127892 | | 11/2018 | |
| KR | 10-2018-0127893 | | 11/2018 | |
| KR | 10-2019-0021977 | | 3/2019 | |
| KR | 102220974 B1 * | | 2/2021 | ....... A61F 13/00063 |
| TW | I729342 B * | | 6/2021 | ....... A61F 13/00063 |
| WO | WO-2015072554 A1 * | | 5/2015 | ......... C08G 73/1078 |
| WO | 2015-156314 | | 10/2015 | |
| WO | WO-2015156314 A1 * | | 10/2015 | ......... C09K 19/3833 |
| WO | 2017-222281 A2 | | 12/2017 | |

* cited by examiner

*Primary Examiner* — Sophie Hon
(74) *Attorney, Agent, or Firm* — Dentons US LLP

(57) ABSTRACT

Provided is a liquid crystal aligning agent composition including a urea-based compound that contains two or more urea functional groups and has a structure in which a hydroxyalkyl group is substituted for a terminal amino group of a urea functional group, together with polyimide and its precursor polymer.

13 Claims, No Drawings

LIQUID CRYSTAL ALIGNING AGENT COMPOSITION, METHOD FOR PREPARING LIQUID CRYSTAL ALIGNMENT FILM USING SAME, AND LIQUID CRYSTAL ALIGNMENT FILM AND LIQUID CRYSTAL DISPLAY DEVICE USING SAME

CROSS-REFERENCE TO RELATED APPLICATIONS

This application is a National Stage Application of International Application No. PCT/KR2019/000278 filed on Jan. 8, 2019, which claims priority to and the benefits of filing dates of Korean Patent Application No. 10-2018-0003580 filed with the Korean Intellectual Property Office on Jan. 10, 2018 and Korean Patent Application No. 10-2019-0001975 filed with the Korean Intellectual Property Office on Jan. 7, 2019, the entire contents of which are incorporated herein by reference.

FIELD

The present invention relates to a liquid crystal aligning agent composition capable of realizing excellent electrical characteristics at a level applicable to a high performance liquid crystal display device and at the same time realizing improved film strength, a method for preparing a liquid crystal alignment film using the same, and a liquid crystal alignment film and a liquid crystal display device using the same.

In a liquid crystal display device, a liquid crystal alignment film plays a role of aligning liquid crystals in a predetermined direction. Specifically, a liquid crystal alignment film acts as a director for the arrangement of liquid crystal molecules, and thus, when the liquid crystals move due to an electric field to form an image, it allows the liquid crystals to align in an appropriate direction. In general, in order to obtain uniform brightness and a high contrast ratio in a liquid crystal display device, it is essential to uniformly align liquid crystals.

As one of conventional methods of aligning liquid crystals, a rubbing method of coating a polymer film such as polyimide onto a substrate such as glass or the like and rubbing a surface thereof using fibers such as nylon or polyester in a predetermined direction has been used. However, the rubbing method can cause serious problems during the manufacturing process of the liquid crystal panel because fine dust or electrostatic discharge (ESD) occurs when the fiber is rubbed on the polymer film.

In order to solve the problems of the rubbing method, a photo-alignment method for inducing anisotropy in a polymer film by light irradiation rather than the rubbing, and aligning liquid crystals using anisotropy, has been studied recently.

As materials that can be used for the photo-alignment method, various materials have been introduced, among which polyimide is mainly used for various superior performance of a liquid crystal alignment film. However, a polyimide is usually poor in solubility in a solvent, so it is difficult to apply directly to a manufacturing process of coating it in a solution state to form an alignment film.

Accordingly, after coating in the form of a precursor such as a polyamic acid or a polyamic acid ester having excellent solubility, a heat treatment process is performed at a temperature of 200° C. to 230° C. to form the polyimide, which is then subjected to light irradiation to perform alignment treatment.

However, recently, as the required performance of the liquid crystal display device has improved and a low power consumption display has been demanded, in order to realize high-quality driving characteristics in a liquid crystal display device, development of an alignment film satisfying a high level of electrical characteristics is regarded as important.

Thus, there is a need to develop a liquid crystal aligning composition capable of realizing excellent electrical characteristics at a level applicable to a high performance liquid crystal display device while realizing alignment stability as a liquid crystal alignment film.

SUMMARY

It is an object of the present invention to provide a liquid crystal aligning agent composition capable of realizing excellent electrical characteristics at a level applicable to a high performance liquid crystal display device and at the same time realizing improved film strength.

It is another object of the present invention to provide a method for preparing a liquid crystal alignment film using the aforementioned liquid crystal aligning agent composition.

It is a further object of the present invention to provide a liquid crystal alignment film prepared by the aforementioned preparation method, and a liquid crystal display device including the same.

In order to achieve the above objects, the present invention provides a liquid crystal aligning agent composition including: a polymer containing polyamic acid repeating units; and a urea-based compound of the following Chemical Formula 1:

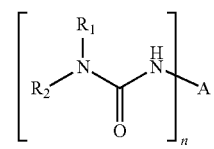

[Chemical Formula 1]

In Chemical Formula 1;
A is a divalent to tetravalent functional group;
n is an integer from 2 to 4; and
one of $R_1$ and $R_2$ is a hydroxyalkyl group having 1 to 20 carbon atoms, and the other is hydrogen, a hydroxyalkyl group having 1 to 20 carbon atoms, an alkyl group having 1 to 20 carbon atoms, or an aryl group having 6 to 20 carbon atoms.

The present invention also includes a method for preparing a liquid crystal alignment film including the steps of: coating the liquid crystal aligning agent composition onto a substrate to form a coating film, drying the coating film, irradiating the dried coating film with light or rubbing the coating film to perform alignment treatment, and heat-treating and curing the alignment-treated coating film.

In addition, the present invention provides a liquid crystal alignment film prepared by the aforementioned preparation method of a liquid crystal alignment film, and a liquid crystal display device including the same.

DETAILED DESCRIPTION

Hereinafter, a liquid crystal aligning agent composition, a method for preparing a liquid crystal alignment film using the same, and a liquid crystal alignment film using the same according to specific embodiments of the present invention will be described in more detail.

I. Liquid Crystal Aligning Agent Composition

According to one embodiment of the invention, a liquid crystal aligning agent composition can be provided, including: a polymer containing polyamic acid repeating units; and a urea-based compound of Chemical Formula 1.

The present inventors found through experiments that, in the liquid crystal aligning agent composition of one embodiment, as a urea compound, which is added together with the polymer containing a polyamic acid repeating unit, contains two or more urea functional groups and has a structure in which a hydroxyalkyl group is substituted for a terminal amino group of a urea functional group as shown in Chemical Formula 1, a liquid crystal cell provided with a liquid crystal alignment film obtained from the liquid crystal alignment agent composition can have high film strength while achieving improved electrical characteristics such as a high voltage holding ratio, a high DC charging speed, and a low DC content remaining in the alignment film, thereby embodying certain aspects of the present invention.

In the case of the polyimide alignment film, it exists in the form of polyamic acid, which is a precursor, in the alignment composition phase for synthesizing it, and there was a problem that the electrical characteristics are weakened due to the carboxyl groups contained in the polyamic acid. In addition, in the alignment film, there is no crosslinking between the repeating units except the bond between repeating units forming the polyimide main chain, and thus, there was a limitation in that the strength of the alignment film is not sufficient.

In this regard, the present inventors found through experiments that as a urea compound of Chemical Formula 1 is applied as a crosslinking agent capable of forming a crosslinked structure between internal repeating units with respect to a polyamic acid corresponding to a polyimide precursor, a crosslinked product is formed via covalent bonds or intermolecular bonds between the carboxyl group at the terminal end of the polyamic acid and the hydroxy group at the terminal end of the urea compound, and thus excellent mechanical strength can be secured, and also found that the activity of the carboxyl group at the terminal end of the polyamic acid is reduced, so the electrical characteristics are improved, thereby embodying certain aspects of the present invention.

Specifically, the carboxyl groups present in the polyamic acid have high reactivity, such as hydrolysis, and thus the possibility of inducing afterimages is high, which is unsuitable for highly reliable liquid crystal alignment films and is a major cause of decreasing electrical characteristics.

In the liquid crystal aligning agent composition of this embodiment, the hydroxyalkyl group is substituted in the terminal amino group of the urea functional group as shown in Chemical Formula 1, so that a hydroxy group at the terminal end can easily form crosslinked bonds with the carboxylic acid in the polyamic acid. Consequently, the crosslinking structure between polyimide main chains is introduced into the finally synthesized liquid crystal alignment film, so that the strength of the alignment film is improved, and the carboxyl group having high reactivity is reduced, thus minimizing the decrease in electrical characteristics due to the carboxyl group.

In particular, as the urea-based compound contained in the liquid crystal aligning agent composition contains two or more urea functional groups as shown in Chemical Formula 1, two or more urea functional groups are connected via a linker group. Therefore, together with an effect of improving electrical characteristics due to a urea functional group, the elasticity and strength of the crosslinked structure are increased through the linker group, and the mechanical properties of the alignment film can be markedly improved.

Hereinafter, the present invention will be described in more detail.

Unless specified otherwise herein, the following terms can be defined as follows.

Throughout the specification, when one part "includes" one constituent element, unless otherwise specifically described, this does not mean that another constituent element is excluded, but means that another constituent element can be further included.

In the present specification, examples of the substituents are described below, but are not limited thereto.

As used herein, the term "substituted" means that other functional groups instead of a hydrogen atom in the compound are bonded, and a position to be substituted is not limited as long as the position is a position at which the hydrogen atom is substituted, that is, a position at which the substituent can be substituted, and when two or more are substituted, the two or more substituents can be the same as or different from each other.

As used herein, the term "substituted or unsubstituted" means being substituted or unsubstituted with one or more substituents selected from the group consisting of deuterium; a halogen group; a cyano group; a nitro group; a hydroxyl group; a carbonyl group; an ester group; an imide group; an amide group; a primary amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an alkoxysilylalkyl group; an arylphosphine group; or a heterocyclic group containing at least one of N, O, and S atoms, or being substituted or un substituted with a substituent to which two or more substituents are linked among the substituents exemplified above. For example, "the substituent to which two or more substituents are linked" can be a biphenyl group. That is, the biphenyl group can also be an aryl group, and can be interpreted as a substituent to which two phenyl groups are linked.

As used herein, the notation

or ⸺ⸯ means a bond linked to another substituent group.

In the present specification, the alkyl group is a monovalent functional group derived from an alkane, and can be a straight chain or a branched chain. The number of carbon atoms of the straight chain alkyl group is not particularly limited, but is preferably 1 to 20. Also, the number of carbon atoms of the branched chain alkyl group is 3 to 20. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, 2,6-dimethylheptane-4-yl, and the like, but are not limited thereto.

In the present specification, a haloalkyl group means a functional group in which the alkyl group as defined above is substituted with at least one halogen and the description of the alkyl group as defined above can be applied.

In the present specification, a hydroxyalkyl group means a functional group in which the alkyl group as defined above is substituted with at least one hydroxyl group (—OH) and the description of the alkyl group as defined can be applied.

In the present specification, an aryl group is a monovalent functional group derived from an arene, and is not particularly limited, but preferably has 6 to 20 carbon atoms, and can be a monocyclic aryl group or a polycyclic aryl group. A monocyclic aryl group can include, but is not limited to, a phenyl group, a biphenyl group, a terphenyl group, or the like. A polycyclic aryl group can include, but is not limited to, a naphthyl group, an anthracenyl group, a phenanthryl group, a pyrenyl group, a perylenyl group, a chrycenyl group, a fluorenyl group, or the like.

In the present specification, an alkenyl group is a monovalent functional group derived from alkene, and can be a straight chain or a branched chain, and the number of carbon atoms thereof is not particularly limited, but is preferably 2 to 20. According to one embodiment, the alkenyl group has 2 to 10 carbon atoms. According to another embodiment, the alkenyl group has 2 to 6 carbon atoms. Specific examples thereof include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group, and the like, but are not limited thereto.

In the present specification, the alkoxy group can be linear, branched, or cyclic. The number of carbon atoms of the alkoxy group is not particularly limited, but is preferably 1 to 30. Specific examples thereof include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy, and the like, but are not limited thereto.

In the present specification, a haloalkoxy group means a functional group in which the alkoxy group as defined above is substituted with at least one halogen, and the description of the alkoxy group as defined above can be applied.

In the present specification, an alkylene group is a bivalent functional group derived from alkane, and the description of the alkyl group as defined above can be applied except that the alkylene is a divalent functional group. For example, the alkylene group is a straight chain or a branched chain, and can include a methylene group, an ethylene group, a propylene group, an isobutylene group, a sec-butylene group, a tert-butylene group, a pentylene group, a hexylene group, or the like.

In the present specification, an arylene group is a bivalent functional group derived from arene, and the description of the aryl group as defined above can be applied, except that they are divalent functional groups. For example, it can be phenylene group, biphenylene group, terphenylene group, and the like.

In the present specification, an alkylene bisarylene group is a divalent functional group in which two arylene groups are bonded to both terminal ends of the alkyl group, and the description of the alkylene group and arylene group as defined above can be applied. For example, it can be a methylene bisphenylene group.

In the present specification, a multivalent organic group is a residue in which a plurality of hydrogen atoms bonding to an arbitrary compound are removed, and for example, it can be a divalent organic group, a trivalent organic group, or a tetravalent organic group. As an example, a tetravalent organic group derived from cyclobutane means a residue in which any four hydrogen atoms bonded to cyclobutane are removed.

As used herein, a direct bond or a single bond means being connected to a bond line where no atoms or atomic groups exist at the corresponding position. Specifically, it means the case where no other atoms exist in the parts represented as $L_1$ and $L_2$ in Chemical Formula.

(1) Polymer

The polymer can include a polyamic acid repeating unit. In addition, if necessary, the polymer can further include one or more repeating units selected from the group consisting of a polyamic acid ester repeating unit and a polyimide repeating unit.

That is, the polymer can include a homopolymer containing only a polyamic acid repeating unit, or a copolymer which essentially contains polyamic acid repeating units, and optionally, in which one kind of polyamic acid ester repeating unit, one kind of polyimide repeating unit, or two or more kinds of repeating units thereof are mixed.

The polyamic acid repeating unit, the polyamic acid ester repeating unit, or the polyimide repeating unit can form a main chain of the polymer.

Specifically, the polyamic acid repeating unit can include a repeating unit of the following Chemical Formula 3.

[Chemical Formula 3]

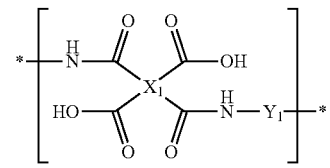

In Chemical Formula 3, $X_1$ can be a tetravalent organic group. The $X_1$ can be a functional group derived from a tetracarboxylic acid dianhydride compound used in synthesis of a polyamic acid. The $Y_1$ can be a functional group derived from a diamine compound used in the synthesis of polyamic acid.

In addition, the polyamic acid ester repeating unit can include a repeating unit of the following Chemical Formula 4, and the polyimide repeating unit can include a repeating unit of the following Chemical Formula 5:

[Chemical Formula 4]

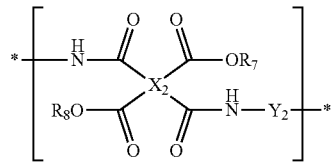

[Chemical Formula 5]

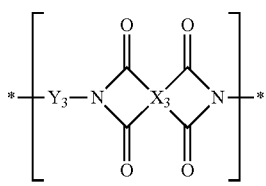

In Chemical Formulae 4 and 5, $X_2$ and $X_3$ can be tetravalent organic groups. The $X_2$ and $X_3$ can be a functional group derived from a polyamic acid ester, or a tetracarboxylic acid dianhydride compound used in the synthesis of a polyimide. The $Y_2$ and $Y_3$ can be a polyamic acid ester, or a functional group derived from a diamine compound used in the synthesis of a polyimide.

More specifically, in Chemical Formulae 3 to 5, $X_1$ to $X_3$ can be the same as or different from each other, and can each independently be one of tetravalent organic groups of the following Chemical Formula 10:

a single bond, —O—, —CO—, —COO—, —S—, —SO—, —SO$_2$—, —(CH$_2$)$_t$—, —O(CH$_2$)$_t$O—, —COO(CH$_2$)$_t$OCO—, —CONH—, phenylene, or a combination thereof, wherein $R_{15}$ and $R_{16}$ are each independently hydrogen or an alkyl group or haloalkyl group having 1 to 10 carbon atoms, and t is an integer from 1 to 10.

More preferably, $X_1$ to $X_3$ can each independently be any one of an organic group of the following Chemical Formula 10-1 derived from pyromellitic dianhydride (PMDA); an organic group of the following Chemical Formula 10-2 derived from 3,3',4,4'-biphenyl tetracarboxylic acid dianhydride (BPDA); an organic group of the following Chemical Formula 10-3 derived from 1,2,4,5-cyclohexanetetracarboxylic dianhydride (HPMDA); an organic group of Chemical Formula 10-4 derived from 1,3-dimethyl-cyclobutane-1,2,3,4-tetracarboxylic acid dianhydride (DMCBDA); an organic group of Chemical Formula 10-5 derived from cyclobutane-1,2,3,4-tetracarboxylic dianhydride; or an organic group of Chemical Formula 10-6 derived from tetrahydro-[3,3'-bifuran]-2,2',5,5'-tetraon.

[Chemical formula 10]

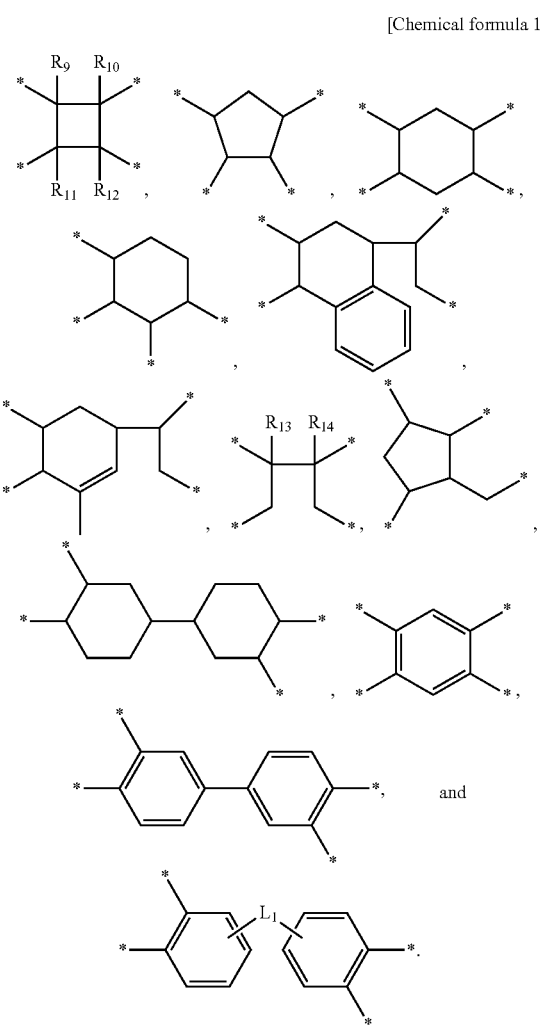

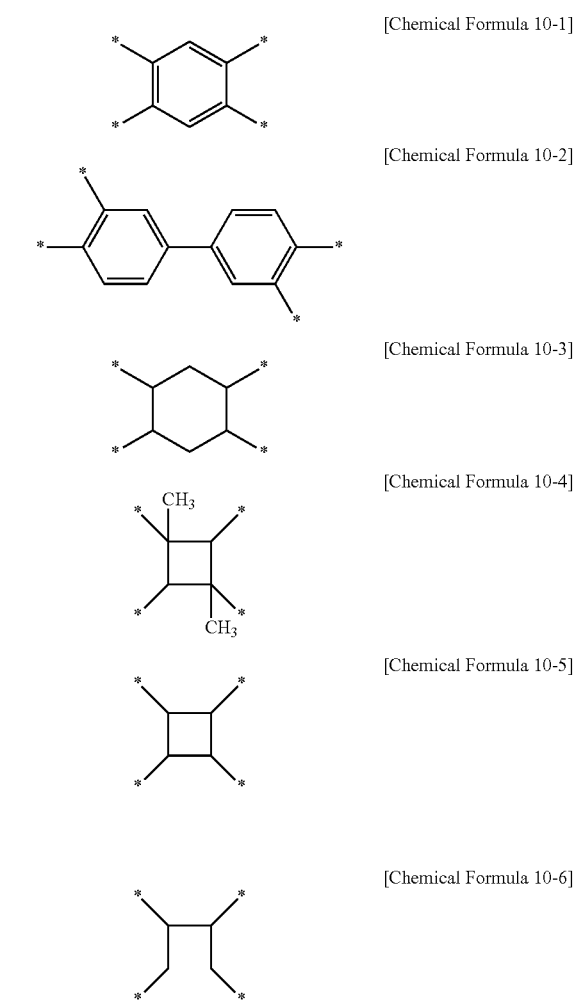

In Chemical Formula 10, $R_9$ to $R_{14}$ are each independently hydrogen or an alkyl group having 1 to 6 carbon atoms, $L_1$ is any one selected from the group consisting of In Chemical Formulae 3 to 5, $Y_1$ to $Y_3$ can be the same as or different from each other and each is independently a bivalent organic group of the following Chemical Formula 6.

[Chemical Formula 6]

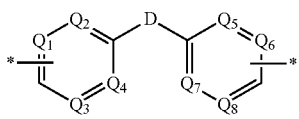

In Chemical Formula 6, at least one of $Q_1$ to $Q_8$ is nitrogen and the rest are carbon, D is —NR'— or —O—, and R' is hydrogen or an alkyl group having 1 to 6 carbon atoms.

Further, in the organic group of Chemical Formula 6, at least one of $Q_1$ to $Q_4$ can be nitrogen and the rest can be carbon, $Q_5$ to $Q_8$ can be carbon, and D can be —NR'—. More preferably, the organic group of Chemical Formula 6 can have the following Chemical Formula 7 wherein $Q_2$ of $Q_1$ to $Q_4$ is nitrogen and the rest are carbon, $Q_5$ to $Q_8$ are carbon, and D is —NH—;

[Chemical Formula 7]

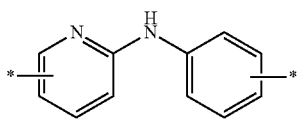

More specifically, the functional group of Chemical Formula 7 which satisfies the above can include functional groups of the following Chemical Formulae 7-1 to 7-3.

[Chemical Formula 7-1]

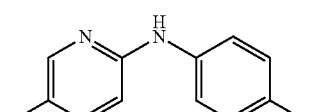

[Chemical Formula 7-2]

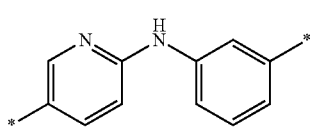

[Chemical Formula 7-3]

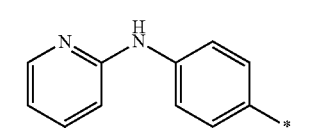

Further, in the organic group of Chemical Formula 6, at least one of $Q_1$ to $Q_4$ can be nitrogen and the rest can be carbon, at least one of $Q_5$ to $Q_8$ can be nitrogen and the rest can be carbon, and D can be —NR'—. More preferably, the organic group of Chemical Formula 6 can have the following Chemical Formula 8 wherein $Q_4$ of $Q_1$ to $Q_4$ is nitrogen and the rest are carbon, $Q_5$ of $Q_5$ to $Q_8$ is nitrogen and the rest are carbon, and D is —NH—:

[Chemical Formula 8]

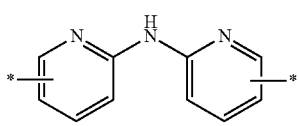

More specifically, the Chemical Formula 8 which satisfies the above can include functional groups of the following Chemical Formulae 8-1 and 8-2.

[Chemical Formula 8-1]

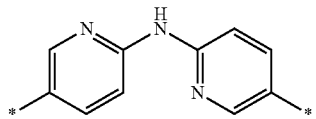

[Chemical Formula 8-2]

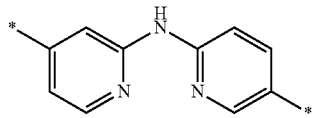

Further, in the organic group of Chemical Formula 6, at least one of $Q_1$ to $Q_4$ can be nitrogen and the rest can be carbon, $Q_5$ to $Q_8$ can be carbon, and D can be —O—. More preferably, the organic group of Chemical Formula 6 can have the following Chemical Formula 9 wherein $Q_2$ of $Q_1$ to $Q_4$ is nitrogen and the rest are carbon, $Q_5$ to $Q_8$ are carbon atoms, and D is —O—:

[Chemical Formula 9]

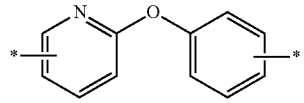

More specifically, Chemical Formula 9 which satisfies the above can include functional groups of the following Chemical Formulae 9-1 to 9-3.

[Chemical Formula 9-1]

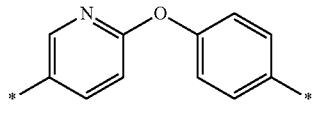

[Chemical Formula 9-2]

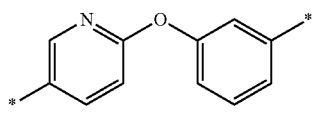

[Chemical Formula 9-3]

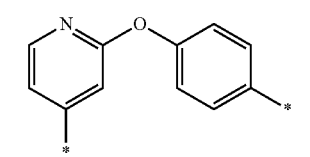

That is, the divalent organic group of Chemical Formula 6 can include a divalent organic group of Chemical Formula 7, a divalent organic group of Chemical Formula 8, and a divalent organic group represented by of Chemical Formula 9. By including the functional group of Chemical Formula 6, the liquid crystal display device to which the polymer for the liquid crystal aligning agent of one embodiment is applied can realize a high voltage holding ratio and liquid crystal alignment property.

Further, in Chemical Formula 4, at least one of $R_7$ and $R_8$ can be an alkyl having 1 to 10 carbon atoms, and the other can be hydrogen.

More specifically, the polyamic acid repeating unit of Chemical Formula 3 can include a combination of tetracarboxylic dianhydride and diamine. The combination of tetracarboxylic dianhydride and diamine corresponds to the reaction product of the tetracarboxylic dianhydride and the diamine. In Chemical Formula 3, $X_1$ is a functional group derived from a polyamic acid, which is a tetracarboxylic acid dianhydride compound used in the synthesis, and $Y_1$ can be a functional group derived from a diamine compound used in the synthesis of polyamic acid.

That is, the tetracarboxylic acid dianhydride can have the following Chemical Formula 3-1. The details of $X_1$ in the following Chemical Formula 3-1 can include the contents mentioned above in Chemical Formula 3:

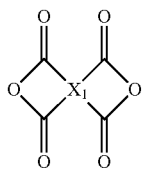

[Chemical Formula 3-1]

Further, the diamine can have the following Chemical Formula 3-2. The details of $Q_1$ to $Q_8$ and D in the following Chemical Formula 3-2 include the contents mentioned above in Chemical Formula 6:

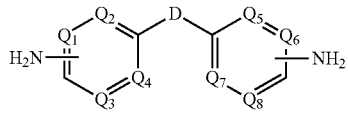

[Chemical Formula 3-2]

The polymer can further include a repeating unit of the following Chemical Formula 11 or 12. That is, the polymer can include one kind of the repeating unit of Chemical Formula 11, one kind of the repeating unit of Chemical Formula 12, or both of the one kind of the repeating unit of Chemical Formula 11 and the one kind of the repeating unit of Chemical Formula 12.

[Chemical Formula 11]

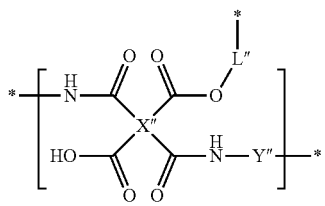

[Chemical Formula 12]

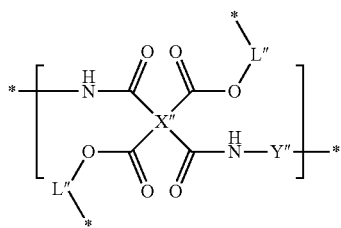

In Chemical Formula 11 or Formula 12, $X''$ is $X_1$ in Chemical Formula 3, $Y''$ is $Y_1$ in Chemical Formula 3, $L''$ is an alkylene group derived from a hydroxyalkyl group having 1 to 20 carbon atoms which is at least one of $R_1$ and $R_2$ in Chemical Formula 1, or an alkylene group derived from a hydroxyalkyl group having 1 to 20 carbon atoms which is at least one of $R_3$ and $R_4$ in Chemical Formula 2, or an alkylene group derived from a hydroxyalkyl group having 1 to 20 carbon atoms which is at least one of $R_5$ and $R_6$ in Chemical Formula 2.

Chemical Formula 11 or 12 is a repeating unit in which the polyamic acid repeating unit of Chemical Formula 3 forms a crosslinking structure with the urea compound of Chemical Formula 1. The crosslinking structure is introduced between internal main chains of the polymer for the liquid crystal aligning agent and the finally produced liquid crystal alignment film through the repeating units of Chemical Formula 11 or 12, thereby realizing excellent mechanical strength.

More specifically, the repeating unit of Chemical Formula 11 or 12 can be formed while reacting the carboxyl group of the polyamic acid repeating unit of Chemical Formula 3 with the terminal hydroxy group of the urea compound of Chemical Formula 1.

The repeating unit of Chemical Formula 11 or 12 can be crosslinked via a central polyfunctional group of the following Chemical Formula 13. That is, in Chemical Formula 11 or 12, "*" positioned at the terminal end can be bonded to "*" of the central polyfunctional group of the following Chemical Formula 13:

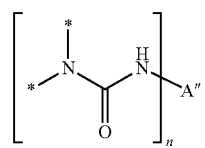

[Chemical Formula 13]

In Chemical Formula 13, $A''$ is A of Chemical Formula 1 or A' of Chemical Formula 2, and n is an integer from 2 to 4.

The repeating unit of Chemical Formula 11 or 12 being crosslinked via a central polyfunctional group of Chemical Formula 13 means that the repeating unit of Chemical Formula 11 or 12 is bonded to the terminal end of the central polyfunctional group of Chemical Formula 13, and thus the repeating unit of Chemical Formula 11 or 12 is bonded via the central polyfunctional group of Chemical Formula 13.

More specifically, for example, the two repeating units of Chemical Formula 11 can be bonded to the central polyfunctional functional group of Chemical Formula 13 to form a crosslinked product of the following Chemical Formula 14:

[Chemical Formula 14]

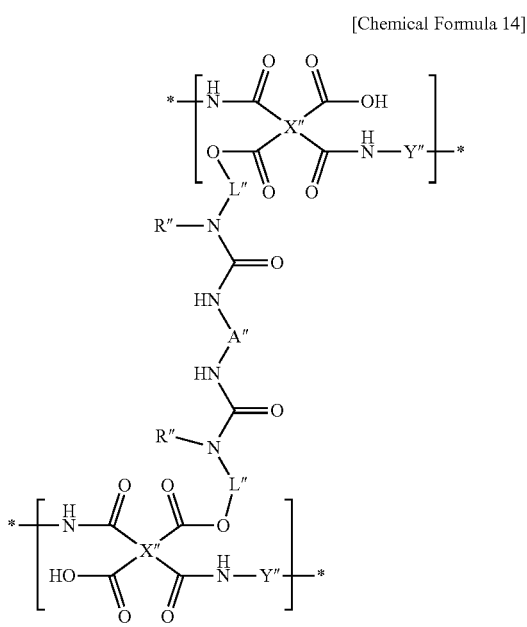

As shown in Chemical Formula 14, it is possible to form a crosslinking via a crosslinking functional group rather than a direct bond between the repeating units forming the main chain of the polyamic acid.

In Chemical Formula 14, R" is one of hydrogen, a hydroxyalkyl group having 1 to 20 carbon atoms, an alkyl group having 1 to 20 carbon atoms, and an aryl group having 6 to 20 carbon atoms. In Chemical Formula 14, when R" is a hydroxyalkyl group having 1 to 20 carbon atoms, the residual hydroxy group can perform a crosslinking reaction with another polyamic acid repeating unit.

Further, in Chemical Formula 14, X" is $X_1$ of Chemical Formula 3, Y" is $Y_1$ of Chemical Formula 3, L" is an alkylene group derived from a hydroxyalkyl group having 1 to 20 carbon atoms which is at least one of $R_1$ and $R_2$ in Chemical Formula 1, or an alkylene group derived from a hydroxyalkyl group having 1 to 20 carbon atoms which is at least one of $R_3$ and $R_4$ in Chemical Formula 2, or an alkylene group derived from a hydroxyalkyl group having 1 to 20 carbon atoms which is at least one of $R_5$ and $R_6$ in Chemical Formula 2, and A" is A of Chemical Formula 1 or A' of Chemical Formula 2.

(2) Urea-Based Compound

The liquid crystal aligning agent composition of one embodiment can contain a urea compound, in addition to the above-mentioned polymer. The urea-based compound can have a specific chemical structure of Chemical Formula 1. The physical/chemical properties of the urea-based compound are considered to be due to the specific structure of Chemical Formula 1.

Specifically, in the case of a structure in which two or more urea functional groups are included as shown in Chemical Formula 1 and at least one hydroxyalkyl group is substituted for the urea functional terminal amino group, the hydroxy group present at the terminal end easily forms a covalent bond or an intermolecular bond with the terminal carboxyl group of the polyamic acid contained in the polymer in the liquid crystal aligning agent composition.

As a result, it is possible to realize high reliability and improved electrical characteristics by lowering the reactivity such as hydrolysis by a carboxyl group present in the polyamic acid in the polymer. The urea compound plays the role of crosslinking between the main chains in the polymer, and the film strength can be improved through formation of the crosslinked product in the finally synthesized alignment film.

The urea-based compound can be used as a urea-based crosslinking agent. The urea-based compound is a compound containing a urea functional group, and can contain a urea compound itself or a derivative thereof.

Specifically, in Chemical Formula 1, A is a divalent to tetravalent functional group, and n can be an integer from 2 to 4. The A is a functional group positioned at the center of the urea compound, and only n functional groups in curly bracket "[ ]" in Chemical Formula 1 can be bonded to the terminal functional group contained in A.

That is, in Chemical Formula 1, when n is 2, A is a divalent functional group, when n is 3, A is a trivalent functional group, and when n is 4, A is a tetravalent functional group. Preferably, in Chemical Formula 1, n is 2, and A is one of an arylene group having 6 to 30 carbon atoms, an alkylene group having 1 to 20 carbon atoms, and an alkylene bisarylene group having 7 to 40 carbon atoms.

Further, in Chemical Formula 1, at least one of $R_1$ and $R_2$ can be a hydroxyalkyl group having 1 to 20 carbon atoms, and the other can be one of hydrogen, an alkyl group having 1 to 20 carbon atoms, or an aryl group having 6 to 20 carbon atoms. That is, in Chemical Formula 1, $R_1$ can be a hydroxyalkyl group having 1 to 20 carbon atoms, and $R_2$ can be one of hydrogen, an alkyl group having 1 to 20 carbon atoms, or an aryl group having 6 to 20 carbon atoms. Further, in Chemical Formula 1, both $R_1$ and $R_2$ can be a hydroxyalkyl group having 1 to 20 carbon atoms.

Preferably, the urea-based compound of Chemical Formula 1 can include a compound of the following Chemical Formula 2:

[Chemical Formula 2]

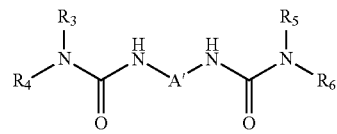

In Chemical Formula 2, A' is one of an arylene group having 6 to 30 carbon atoms, an alkylene group having 1 to 20 carbon atoms, and an alkylene bisarylene group having 7 to 40 carbon atoms; one of $R_3$ and $R_4$ is a hydroxyalkyl group having 1 to 20 carbon atoms and the other is one of hydrogen, a hydroxyalkyl group having 1 to 20 carbon atoms, an alkyl group having 1 to 20 carbon atoms, and an aryl group having 6 to 20 carbon atoms; and one of $R_5$ and $R_6$ is a hydroxyalkyl group having 1 to 20 carbon atoms, and the other is one of hydrogen, a hydroxyalkyl group having 1 to 20 carbon atoms, an alkyl group having 1 to 20 carbon atoms, and an aryl group having 6 to 20 carbon atoms.

That is, in Chemical Formula 2, $R_3$ can be a hydroxyalkyl group having 1 to 20 carbon atoms, and $R_4$ can be one of hydrogen, an alkyl group having 1 to 20 carbon atoms, and an aryl group having 6 to 20 carbon atoms. Further, in Chemical Formula 2, both $R_3$ and $R_4$ can be a hydroxyalkyl group having 1 to 20 carbon atoms.

In addition, in Chemical Formula 2, $R_5$ can be a hydroxyalkyl group having 1 to 20 carbon atoms, and $R_6$ can be one of hydrogen, an alkyl group having 1 to 20 carbon atoms, and an aryl group having 6 to 20 carbon atoms. Further, in Chemical Formula 2, both $R_5$ and $R_6$ can be a hydroxyalkyl group having 1 to 20 carbon atoms.

More specifically, in A' of Chemical Formula 2, the arylene group having 6 to 30 carbon atoms can be an arylene group having 6 to 10 carbon atoms, and specifically, a phenylene group.

Further, in A' of Chemical Formula 2, the alkylene group having 1 to 20 carbon atoms can be an alkylene group having 1 to 10 carbon atoms, and specifically, a hexylene group having 6 carbon atoms.

In addition, in A' of Chemical Formula 2, the alkylene bisarylene group having 7 to 40 carbon atoms can be an alkylene bisarylene group having 7 to 20 carbon atoms, and specifically, a methylene bisphenylene group.

Specific examples of the urea-based compound of Chemical Formula 2 can include one or more compounds selected from the group consisting of a compound of the following Chemical Formula 2-1, a compound of the following Chemical Formula 2-2, a compound of the following Chemical Formula 2-3, a compound of the following Chemical Formula 2-4, a compound of the following Chemical Formula 2-5, and a compound of the following Chemical Formula 2-6:

[Chemical Formula 2-1]

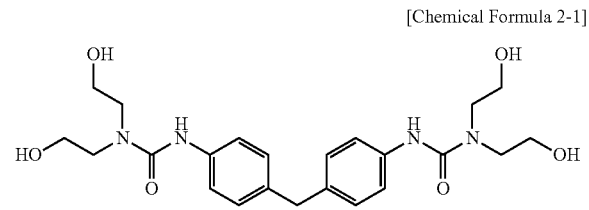 [SMILES: O=C(Nc1ccc(Cc2ccc(NC(=O)N(CCO)CCO)cc2)cc1)N(CCO)CCO]

[Chemical Formula 2-2]

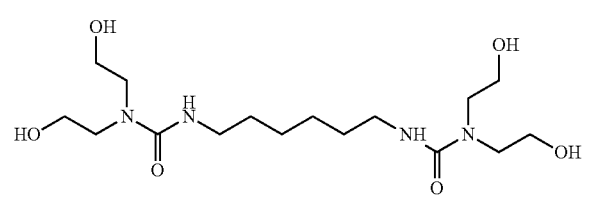

[Chemical Formula 2-3]

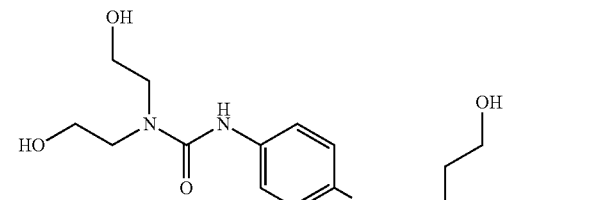

[Chemical Formula 2-4]

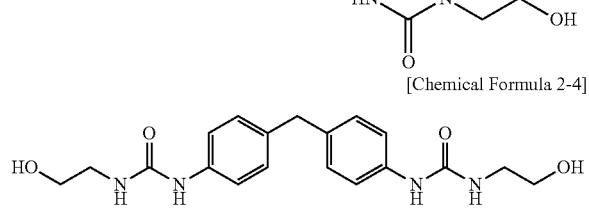

[Chemical Formula 2-5]

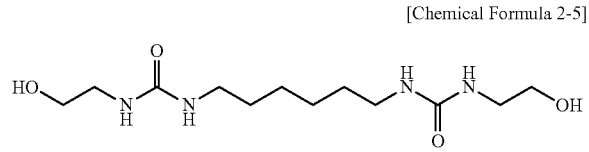

[Chemical Formula 2-6]

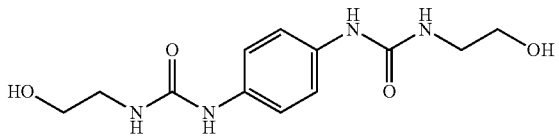

The urea-based compound of Chemical Formula 1 can be contained in an amount of 0.1% to 20% by weight, or 1% to 5% by weight, based on the total weight of the liquid crystal aligning agent composition. When the content of the urea-based compound is too large, the degree of crosslinking of the polymer for a liquid crystal aligning agent is excessively increased, and thus the flexibility of the polymer can be reduced and coating properties on the substrate can be reduced by the increase in viscosity of the composition or the gelation reaction in the composition.

On the other hand, when the content of the urea-based compound is too small, it can be difficult to sufficiently realize the effect of improving the electrical characteristics resulting from the addition of the urea-based compound in the liquid crystal aligning agent composition.

II. Method of Preparing Liquid Crystal Alignment Film

In addition, the present invention provides a method for preparing a liquid crystal alignment film, including: a step of coating the liquid crystal aligning agent composition onto a substrate to form a coating film (step 1); a step of drying the coating film (step 2); a step of irradiating the dried coating film with light or rubbing the coating film to perform alignment treatment (step 3); and a step of heat treating and curing the alignment-treated coating film (step 4).

Step 1 is a step of coating the liquid crystal aligning agent composition onto a substrate to form a coating film. The details of the liquid crystal aligning agent composition includes those described above in one embodiment.

The method of coating the liquid crystal aligning agent composition onto a substrate is not particularly limited, and for example, a method such as screen printing, offset printing, flexographic printing, inkjet printing, and the like can be used.

Further, the liquid crystal aligning agent composition can be dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, and the like. They can be used alone or in combination of two or more.

In addition, the liquid crystal aligning agent composition can further include other components in addition to the organic solvent. In a non-limiting example, when the liquid crystal aligning agent composition is coated, additives capable of improving the uniformity of the thickness of a film and the surface smoothness, improving the adhesion between a liquid crystal alignment film and a substrate, changing the dielectric constant and conductivity of a liquid crystal alignment film, or increasing the denseness of a liquid crystal alignment film, can be further included. Examples of these additives include various kinds of solvents, surfactants, silane-based compounds, dielectrics, crosslinking compounds, etc.

Step 2 is a step of drying the coating film formed by coating the liquid crystal aligning agent composition onto a substrate.

The step of drying the coating film can be performed by a heating means such as a hot plate, a hot air circulating oven, an infrared oven, and the like, and the drying can be performed at a temperature of 50° C. to 150° C., or 50° C. to 100° C.

Step 3 is a step of irradiating the dried coating film with light or rubbing the coating film to perform alignment treatment.

In the alignment treatment step, the light irradiation can be performed by irradiating polarized ultraviolet rays having a wavelength of 150 nm to 450 nm. In this case, the intensity of the light exposure can vary depending on the kind of the polymer for a liquid crystal aligning agent, and energy of 10 mJ/cm$^2$ to 10 J/cm$^2$, preferably energy of 30 mJ/cm$^2$ to 2 J/cm$^2$, can be irradiated.

As for the ultraviolet rays, polarized ultraviolet rays selected among ultraviolet rays subjected to polarization treatment by a method of passing through or reflecting with a polarizing device using a substrate in which a dielectric anisotropic material is coated onto the surface of a transparent substrate such as quartz glass, soda lime glass, soda lime-free glass, etc., a polarizer plate on which aluminum or metal wires are finely deposited, a Brewster's polarizing device by the reflection of quartz glass, etc., are irradiated to perform the alignment treatment. Herein, the polarized ultraviolet rays can be irradiated perpendicularly to the surface of the substrate, or can be irradiated by directing an angle of incidence toward a specific angle. By this method, the alignment capability of the liquid crystal molecules is imparted to the coating film.

Further, in the alignment treatment step, a method using a rubbing cloth can be employed. More specifically, in the rubbing treatment, the surface of the coating film after the heat treatment step can be rubbed in one direction while rotating a rubbing roller of which a rubbing cloth is attached to a metal roller.

Step 4 is a step of heat treating and curing the alignment-treated coating film.

In this case, the heat treatment can be performed by a heating means such as a hot plate, a hot-air circulation furnace, an infrared furnace, and the like, and the heat treatment can be performed at a temperature of 180° C. to 300° C., or 200° C. to 300° C.

III. Liquid Crystal Alignment Film

Further, the present invention can provide a liquid crystal alignment film prepared in accordance with the method for preparing a liquid crystal alignment film described above. Specifically, the liquid crystal alignment film can include an aligned cured product of the liquid crystal aligning agent composition of the one embodiment. The aligned cured product means a material obtained through an alignment step and a curing step of the liquid crystal aligning agent composition of the one embodiment.

As described above, when a liquid crystal aligning agent composition including a polymer containing polyamic acid repeating units, and a urea-based compound of Chemical Formula 1 is used, it is possible to prepare a liquid crystal alignment film having improved electrical characteristics such as a high voltage holding ratio in the liquid crystal cell, and a high DC charging speed and thus a low DC content remaining in the alignment film.

The thickness of the liquid crystal alignment film is not particularly limited, but for example, it can be freely adjusted within the range of 0.01 μm to 1000 If the thickness of the liquid crystal alignment film increases or decreases by a specific value, the physical properties measured in the alignment film can also change by a certain value.

IV. Liquid Crystal Display Device

In addition, the present invention provides a liquid crystal display device including the liquid crystal alignment film described above.

The liquid crystal alignment film can be introduced into a liquid crystal cell by a known method, and likewise, the liquid crystal cell can be introduced into a liquid crystal display device by a known method. The liquid crystal alignment film can be prepared from the liquid crystal aligning agent composition of another embodiment, thereby achieving excellent stability together with various excellent physical properties. Consequently, the liquid crystal display device capable of exhibiting high reliability can be provided.

According to the present invention, a liquid crystal aligning agent composition capable of realizing excellent electrical characteristics at a level applicable to a high performance liquid crystal display device and at the same time realizing an improved film strength, a method for preparing a liquid crystal alignment film using the same, and a liquid crystal alignment film and a liquid crystal display device using the same, can be provided.

EXAMPLES

The present invention will be described in more detail by way of examples. However, these examples are given for illustrative purposes only, and the scope of the invention is not intended to be limited to or by these examples.

Preparation Example: Preparation of Diamine

Preparation Example 1

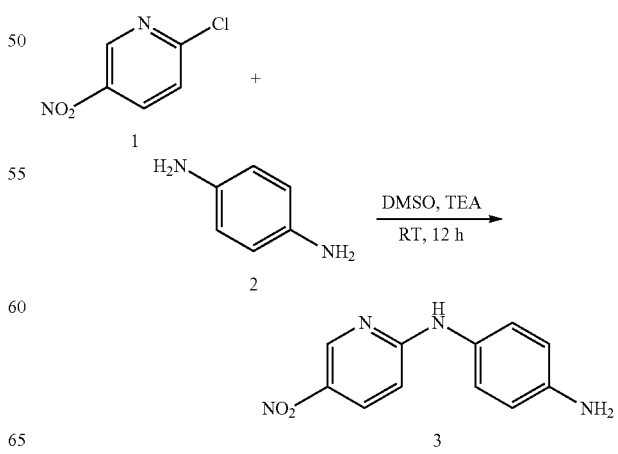

18.3 g (100 mmol) of 2-chloro-5-nitropyridine (Compound 1) and 12.5 g (98.6 mmol) of paraphenylenediamine (p-PDA, Compound 2) were completely dissolved in 200 mL of dimethyl sulfoxide (DMSO), and then 23.4 g (200 mmol) of triethylamine (TEA) was added thereto and stirred at room temperature for 12 hours. When the reaction was completed, the reaction mixture was added to a container containing 500 mL of water and stirred for 1 hour. A solid obtained by filtration was washed with 200 mL of water and 200 mL of ethanol to synthesize 16 g (61.3 mmol) of Compound 3 (yield: 60%).

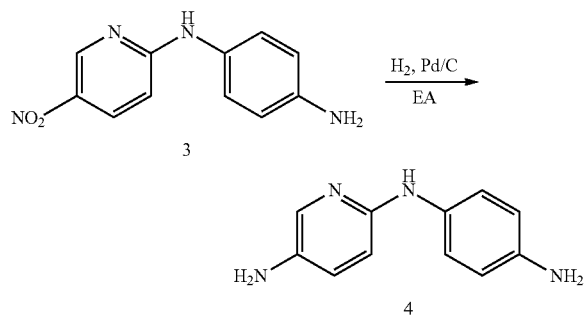

Compound 3 was dissolved in 200 mL of a 1:1 mixture of ethyl acetate (EA) and THF, and then 0.8 g of palladium (Pd)/carbon (C) was added thereto and stirred for 12 hours in a hydrogen atmosphere. After completion of the reaction, the reaction mixture was filtered through a Celite pad, and the filtrate was concentrated to give 11 g of the diamine (Compound 4) of Preparation Example 1 (yield: 89%).

Preparation Example 2

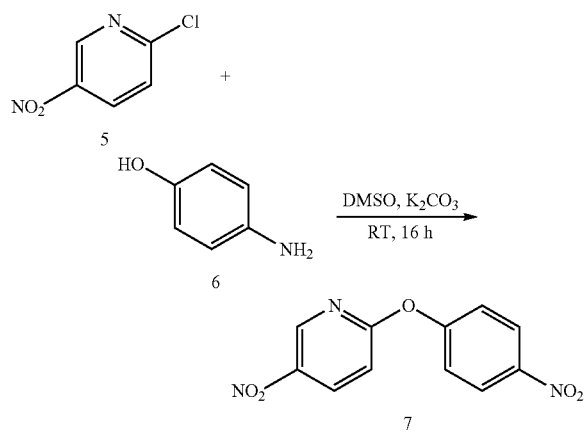

17.1 g (100 mmol) of 2-chloro-5-nitropyridine (Compound 5) and 12.5 g (98.6 mmol) of 4-nitrophenol (Compound 6) were completely dissolved in 200 mL of dimethyl sulfoxide (DMSO), and then 27.2 g (200 mmol) of potassium carbonate ($K_2CO_3$) was added thereto and then stirred at room temperature for 16 hours. When the reaction was completed, the reaction mixture was added to a container containing 500 mL of water and stirred for 1 hour. The solid obtained by filtration was washed with 200 mL of water and 200 mL of ethanol to give 16 g (61.3 mmol) of Compound 7 (yield: 57%).

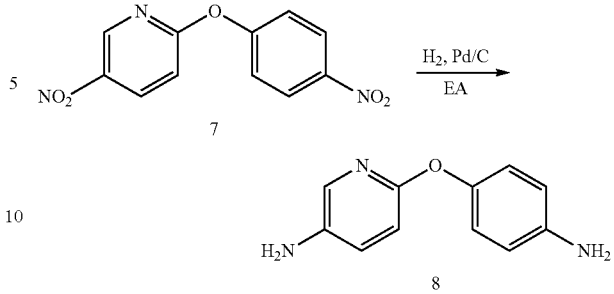

Compound 7 was dissolved in 200 mL of a 1:1 mixture of ethyl acetate (EA) and THF, and then 0.8 g of palladium (Pd)/carbon (C) was added thereto and then stirred for 12 hours in a hydrogen atmosphere. After completion of the reaction, the reaction mixture was filtered through a Celite pad, and the filtrate was concentrated to give 11 g of the diamine (Compound 8) of Preparation Example 2 (yield: 89%).

Preparation Example 3

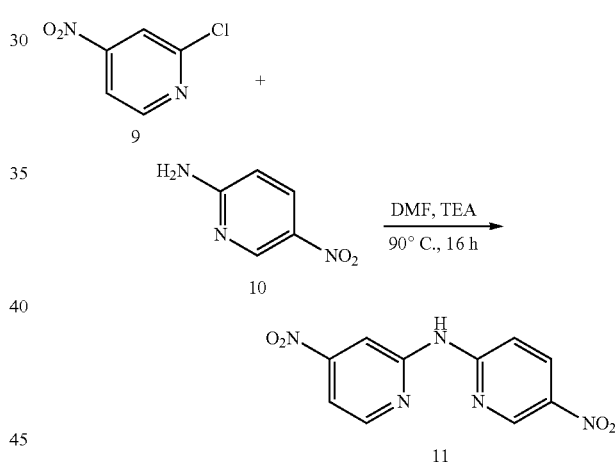

15.0 g (95 mmol) of 2-chloro-4-nitropyridine (Compound 9) and 13.8 g (99 mmol) of 5-nitropyridin-2-amine (Compound 10) were completely dissolved in 200 mL of dimethylformamide (DMF), and then 23.4 g (200 mmol) of triethylamine (TEA) was added thereto and then stirred at 90° C. for 16 hours. When the reaction was completed, the reaction mixture was added to a container containing 500 mL of water and stirred for 1 hour. The solid obtained by filtration was washed with 200 mL of ultrapure water to give 15 g (42.5 mmol) of Compound 11 (yield: 45%).

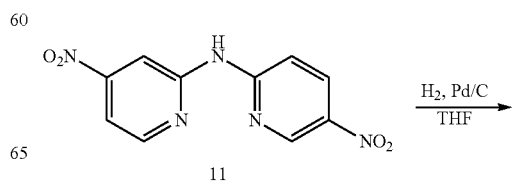

-continued

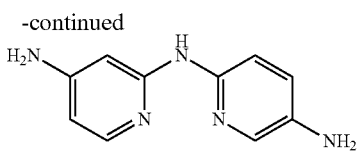

12

Compound 11 was dissolved in 200 mL of tetrahydrofuran (THF), and then 0.8 g of palladium (Pd)/carbon (C) was added thereto and then stirred for 12 hours in a hydrogen atmosphere. After completion of the reaction, the reaction mixture was filtered through a Celite pad, and the filtrate was concentrated to give 9.0 g of the diamine (Compound 12) of Preparation Example 3 (yield: 60%).

EXAMPLES: PREPARATION OF LIQUID CRYSTAL ALIGNING AGENT COMPOSITION AND LIQUID CRYSTAL ALIGNMENT FILM

Example 1

(1) Preparation of Liquid Crystal Aligning Agent Composition

As shown in Table 1 below, 14.637 g (0.073 mmol) of the diamine of Preparation Example 1 was dissolved in 225.213 g of NMP, and then 20.0 g (0.068 mmol) of 3,3',4,4'-biphenyltetracarboxylic acid dianhydride was added thereto and stirred at 25° C. for 16 hours to synthesize a polyamic acid polymer. Subsequently, 1,1'-(4,4'-methylenebis (4,1-phenylene))bis(3,3-bis(2-hydroxyethyl)urea) [MDI-U] of the following Chemical Formula a was added in an amount of 3 wt % relative to the entire composition and the mixture was stirred for 20 hours to prepare a liquid crystal aligning agent composition:

[Chemical Formula a]

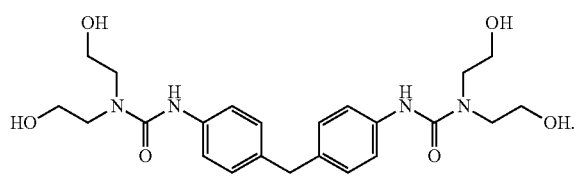

(2) Preparation of Liquid Crystal Alignment Film

The liquid crystal aligning agent composition obtained in (1) of Example 1 was coated onto a rectangular glass substrate having a size of 2.5 cm×2.7 cm, in which an ITO electrode having a thickness of 60 nm and an area of 1 cm×1 cm was patterned, by using a spin coating method. Then, the substrate coated with the liquid crystal aligning agent composition was placed and dried on a hot plate at about 80° C. for 2 minutes. Subsequently, the dried coating film was irradiated with 254 nm ultraviolet rays in an exposure amount of 0.25 J/cm² using an exposure machine to which a linear polarizer was attached, to perform alignment treatment. The alignment-treated film was calcinated (cured) in an oven at 230° C. for 15 minutes to prepare a liquid crystal alignment film having a thickness of 0.1 μm.

Example 2

A liquid crystal aligning agent composition and a liquid crystal alignment film were prepared in the same manner as in Example 1, except that 1,1'-(hexane-1,6-diyl)bis(3,3-bis (2-hydroxyethyl)urea) [HexaDI-U] of the following Chemical Formula b was added instead of 1,1'-(4,4'-methylenebis (4,1-phenylene))bis(3,3-bis(2-hydroxyethyl)urea) of Chemical Formula a, as shown in Table 1 below:

[Chemical Formula b]

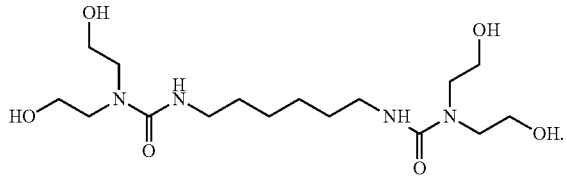

Example 3

A liquid crystal aligning agent composition and a liquid crystal alignment film were prepared in the same manner as in Example 1, except that 1,1'-(1,4-phenylene)bis(3,3-bis(2-hydroxyethyl)urea) [PheDI-U] of the following Chemical Formula c was added instead of 1,1'-(4,4'-methylenebis(4,1-phenylene))bis(3,3-bis(2-hydroxyethyl)urea) by of Chemical Formula a, as shown in Table 1 below:

[Chemical Formula c]

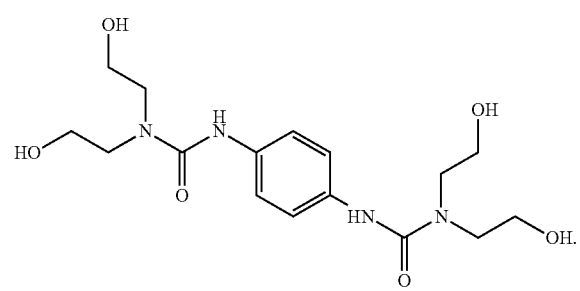

Examples 4 to 6

A liquid crystal aligning agent composition and a liquid crystal alignment film were prepared in the same manner as in Examples 1 to 3, except that 14.708 g (0.073 mmol) of the diamine of Preparation Example 2 was added instead of 14.637 g (0.073 mmol) of the diamine of Preparation Example 1, as shown in Table 2 below.

Example 7

As shown in Table 3 below, 1.408 g (7 mmol) of the diamine prepared in Preparation Example 3 was completely dissolved in 15.37 g of anhydrous N-methyl pyrrolidone (NMP). Then, 1.304 g (6.65 mmol) of cyclobutane-1,2,3,4-tetracarboxylic dianhydride (CBDA) was added to the solution under an ice bath and stirred at room temperature for 16 hours to synthesize a polyamic acid polymer.

Subsequently, as in Example 1, 1,1'-(4,4'-methylenebis(4, 1-phenylene))bis(3,3-bis(2-hydroxyethyl)urea) [MDI-U] of Chemical Formula a was added in an amount of 3 wt % relative to the entire composition, and the mixture was stirred for 20 hours to prepare a liquid crystal aligning agent composition.

In addition, a liquid crystal alignment film was prepared in the same manner as in Example 1.

Example 8

A liquid crystal aligning agent composition and a liquid crystal alignment film were prepared in the same manner as in Example 7, except that 1,1'-(hexane-1,6-diyl)bis(3,3-bis(2-hydroxyethyl)urea) [HexaDI-U] of Chemical Formula b was added instead of 1,1'-(4,4'-methylenebis(4,1-phenylene))bis(3,3-bis(2-hydroxyethyl)urea) of Chemical Formula a, as shown in Table 3 below.

Example 9

A liquid crystal aligning agent composition and a liquid crystal alignment film were prepared in the same manner as in Example 7, except that 1,1'-(1,4-phenylene)bis(3,3-bis(2-hydroxyethyl)urea) [PheDI-U] of Chemical Formula c was added instead of 1,1'-(4,4'-methylenebis(4,1-phenylene))bis(3,3-bis(2-hydroxyethyl)urea) of Chemical Formula a as shown in Table 3 below.

Example 10

A liquid crystal aligning agent composition and a liquid crystal alignment film were prepared in the same manner as in Example 1, except that 1,1'-(4,4'-methylenebis(4,1-phenylene))bis(3-(2-hydroxyethyl)urea) of the following Chemical Formula f was added instead of 1,1'-(4,4'-methylenebis(4,1-phenylene))bis(3,3-bis(2-hydroxyethyl)urea) of Chemical Formula a, as shown in Table 1 below:

[Chemical Formula f]

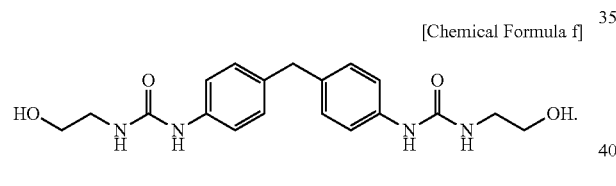

Example 11

A liquid crystal aligning agent composition and a liquid crystal alignment film were prepared in the same manner as in Example 1, except that 1,1'-(hexane-1,6-diyl)bis(3-(2-hydroxyethyl)urea) of the following Chemical Formula g was added instead of 1,1'-(4,4'-methylenebis(4,1-phenylene))bis(3,3-bis(2-hydroxyethyl)urea) of Chemical Formula a, as shown in Table 1 below:

[Chemical Formula g]

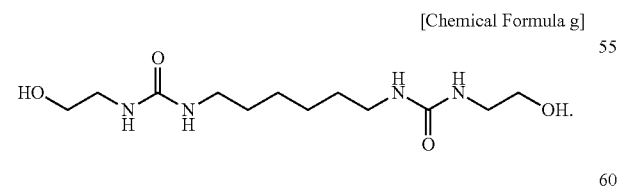

Example 12

A liquid crystal aligning agent composition and a liquid crystal alignment film were prepared in the same manner as in Example 1, except that 1,1'-(hexane-1,6-diyl)bis(3-(2-hydroxyethyl)urea) of the following Chemical Formula h was added instead of 1,1'-(4,4'-methylenebis(4,1-phenylene))bis(3,3-bis(2-hydroxyethyl)urea) of Chemical Formula a, as shown in Table 1 below.

[Chemical Formula h]

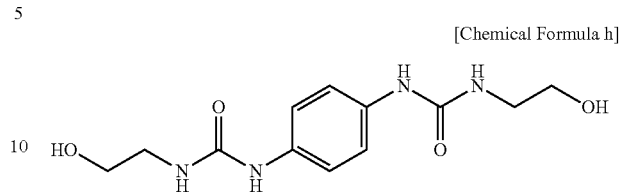

Comparative Example: Preparation of Liquid Crystal Aligning Agent Composition and Liquid Crystal Alignment Film Comparative Example 1

A liquid crystal aligning agent composition and a liquid crystal alignment film were prepared in the same manner as in Example 1, except that 1,1'-(4,4'-methylenebis(4,1-phenylene))bis(3,3-bis(2-hydroxyethyl)urea) of Chemical Formula a was not added, as shown in Table 1 below.

Comparative Example 2

A liquid crystal aligning agent composition and a liquid crystal alignment film were prepared in the same manner as in Example 1, except that 1,1'-(1,4-phenylene)bis(3-(3-(triethoxysilyl)propyl)urea) of the following Chemical Formula d was added instead of 1,1'-(4,4'-methylenebis(4,1-phenylene))bis (3,3-bis(2-hydroxyethyl)urea) of Chemical Formula a as shown in Table 1 below.

[Chemical Formula d]

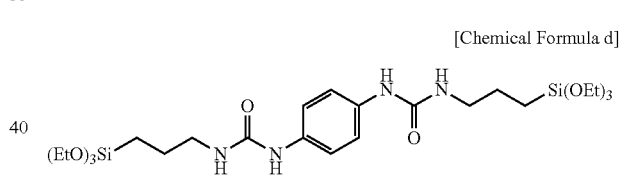

Comparative Example 3

A liquid crystal aligning agent composition and a liquid crystal alignment film were prepared in the same manner as in Example 1, except that 1,1,3,3-tetrakis(hydroxymethyl)urea of the following Chemical Formula e was added instead of 1,1'-(4,4'-methylenebis(4,1-phenylene))bis (3,3-bis(2-hydroxyethyl)urea) of Chemical Formula a, as shown in Table 1 below.

[Chemical Formula e]

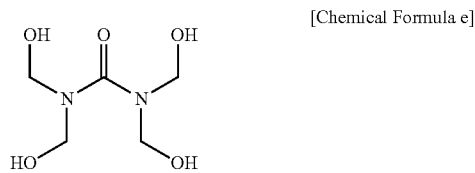 [SMILES: O=C(N(CO)CO)N(CO)CO]

Comparative Example 4

A liquid crystal aligning agent composition and a liquid crystal alignment film were prepared in the same manner as in Example 4, except that 1,1'-(4,4'-methylenebis(4,1-phenylene))bis(3,3-bis(2-hydroxyethyl)urea) of Chemical Formula a was not added, as shown in Table 2 below.

Comparative Example 5

A liquid crystal aligning agent composition and a liquid crystal alignment film were prepared in the same manner as in Example 4, except that 1,1'-(1,4-phenylene)bis(3-(3-(triethoxysilyl)propyl)urea) of Chemical Formula d was added instead of 1,1'-(4,4'-methylenebis(4,1-phenylene))bis(3,3-bis(2-hydroxyethyl)urea) of Chemical Formula a, as shown in Table 2 below.

Comparative Example 6

A liquid crystal aligning agent composition and a liquid crystal alignment film were prepared in the same manner as in Example 4, except that 1,1,3,3-tetrakis(hydroxymethyl) urea of Chemical Formula e was added instead of 1,1'-(4,4'-methylenebis(4,1-phenylene))bis(3,3-bis(2-hydroxyethyl)urea) of Chemical Formula a as shown in Table 2 below.

Comparative Example 7

A liquid crystal aligning agent composition and a liquid crystal alignment film were prepared in the same manner as in Example 7, except that 1,1'-(4,4'-methylenebis(4,1-phenylene))bis(3,3-bis(2-hydroxyethyl)urea) of Chemical Formula a was not added, as shown in Table 3 below.

Comparative Example 8

A liquid crystal aligning agent composition and a liquid crystal alignment film were prepared in the same manner as in Example 7, except that 1,1'-(1,4-phenylene)bis(3-(3-(triethoxysilyl)propyl)urea) of Chemical Formula d was added instead of 1,1'-(4,4'-methylenebis(4,1-phenylene))bis(3,3-bis(2-hydroxyethyl)urea) of Chemical Formula a, as shown in Table 3 below.

Comparative Example 9

A liquid crystal aligning agent composition and a liquid crystal alignment film were prepared in the same manner as in Example 7, except that 1,1,3,3-tetrakis(hydroxymethyl) urea of Chemical Formula e was added instead of 1,1'-(4,4'-methylenebis(4,1-phenylene))bis(3,3-bis(2-hydroxyethyl)urea) of Chemical Formula a, as shown in Table 3 below.

Experimental Example: Measurement of Physical Properties of Liquid Crystal Aligning Agent Composition and Liquid Crystal Alignment Film Obtained in Examples and Comparative Examples The physical properties of the liquid crystal aligning agent composition or liquid crystal alignment film obtained in the examples and comparative examples, and the liquid crystal alignment cell prepared using the same, were measured by the following methods, and the results are shown in Table 1.

A specific method of preparing a liquid crystal alignment cell is as follows. The liquid crystal alignment films formed on two glass substrates respectively used as an upper plate and a lower plate were aligned such that they faced each other, and the upper and lower plates were bonded together and then cured using a sealing agent, thereby preparing an empty cell. Then, a liquid crystal was injected into the empty cell and the injection hole was sealed, thereby preparing the liquid crystal cell.

1. Voltage Holding Ratio (VHR)

The voltage holding ratio of the liquid crystal alignment cell was measured under the conditions of 1 Hz and 60° C. using 6254C equipment available from TOYO Corporation.

2. Evaluation of RDC (Residual DC Voltage, Residual DC)

For the liquid crystal alignment cell, DC stress was set to +DC in the range of 0.5 to 1 V and applied at 60° C. for 1 minute, and then left in a state where no voltage was applied for 2 minutes. The remaining amount of DC was measured as residual DC.

3. Film Strength

The film strength for the alignment films obtained in the examples and comparative examples was measured, and the results are shown in Table 1 below. Specifically, the film strength of the alignment films was measured via a pencil hardness tester according to the ASTM D3363 test standard by loading a weight of 50 g and using pencils of various hardnesses.

TABLE 1

Results of measurement of experimental examples of Examples 1-3 and Comparative Examples 1-3

| Category | Example 1 | Example 2 | Example 3 | Comparative Example 1 | Comparative Example 2 | Comparative Example 3 |
|---|---|---|---|---|---|---|
| Diamine | | | Preparation Example 1 | | | |
| Kind of urea additive | Formula a [MDI-U] | Formula b [HexaDI-U] | Formula c [PheDI-U] | — | Formula d | Formula e |
| VHR (%) | 95.3 | 90.6 | 93.7 | 81.2 | 75.9 | 90.3 |
| Residual DC (mV) | 80 | 75 | 85 | 303 | 350 | 105 |
| Film strength | 4H | 3H | 4H | 1H | 1H | 2H |

TABLE 2

Results of measurement of experimental examples of Examples 4-6 and Comparative Examples 4-6

| Category | Example 4 | Example 5 | Example 6 | Comparative Example 4 | Comparative Example 5 | Comparative Example 6 |
|---|---|---|---|---|---|---|
| Diamine | | | Preparation Example 2 | | | |
| Kind of urea additive | Formula a [MDI-U] | Formula b [HexaDI-U] | Formula c [PheDI-U] | — | Formula d | Formula e |
| VHR (%) | 91.3 | 87.9 | 88.6 | 63.9 | 50.6 | 70.9 |
| Residual DC (mV) | 20 | 43 | 38 | 218 | 300 | 134 |
| Film strength | 3H | 3H | 3H | 0H | 1H | 1H |

TABLE 3

Results of measurement of Experimental Examples of Examples 7-9 and Comparative Examples 7-9

| Category | Example 7 | Example 8 | Example 9 | Comparative Example 7 | Comparative Example 8 | Comparative Example 9 |
|---|---|---|---|---|---|---|
| Diamine | | | Preparation Example 3 | | | |
| Kind of urea additive | Formula a [MDI-U] | Formula b [HexaDI-U] | Formula c [PheDI-U] | — | Formula d | Formula e |
| VHR (%) | 93.6 | 96.8 | 95.4 | 85.3 | 70.6 | 87.8 |
| Residual DC (mV) | 25 | 29 | 13 | 105 | 234 | 60 |
| Film strength | 4H | 3H | 4H | 1H | 2H | 2H |

TABLE 4

Results of measurement of experimental examples of Examples 10-12

| Category | Example 10 | Example 11 | Example 12 |
|---|---|---|---|
| Diamine | Preparation Example 1 | Preparation Example 1 | Preparation Example 1 |
| Kind of urea additive | Formula f | Formula g | Formula h |
| VHR (%) | 91.4 | 92.6 | 90.2 |
| Residual DC (mV) | 91.1 | 82.2 | 84.0 |
| Film strength | 3H | 3H | 3H |

As shown in Tables 1 to 4 above, it can be confirmed that in the case of the liquid crystal aligning agent compositions of Examples 1 to 12 to which a compound containing two or more urea groups while containing a hydroxy group at the terminal end as a urea additive was added, they exhibit excellent electrical characteristics with a high voltage holding ratio and a low residual DC voltage in the liquid crystal cells to which the liquid crystal alignment films obtained from the compositions were applied, and at the same time, have remarkably improved high film strength, as compared with Comparative Examples 1 to 9.

This is presumably because, in a compound containing two or more urea groups while containing a hydroxyl group at the terminal end thereof, the terminal hydroxyl group can react with the carboxyl group of the polyamic acid polymer to form a crosslink and at the same time inhibit the decrease in electrical characteristics due to the carboxyl group, and further two or more urea groups are linked via a linker to form a crosslinked structure, thereby allowing the final crosslinked product to secure certain elasticity.

Specifically, in the case of the alignment films obtained from the liquid crystal aligning agent compositions of Comparative Examples 1, 4, and 7, which contained no urea additive, the voltage holding ratio was decreased, the residual DC voltage was increased, and the film strength was decreased, as compared with examples using the same diamine.

Further, in the case of the liquid crystal alignment films obtained from the liquid crystal aligning agent compositions of Comparative Examples 2, 5, and 8, in which the urea compound containing an alkoxysilyl group at the terminal end was added as a urea additive, the voltage holding ratio was decreased, the residual DC voltage was increased, and the film strength was decreased, as compared with the examples using the same diamine.

Further, it was confirmed that in the case of the liquid crystal alignment films obtained from the liquid crystal aligning agent compositions of Comparative Examples 3, 6, and 9 to which a compound containing only one urea group as a urea additive was added, the voltage holding ratio was decreased, the residual DC voltage was increased, and the film strength was decreased, as compared with the embodiment using the same diamine.

The invention claimed is:

1. A liquid crystal aligning agent composition comprising:
   a polymer containing polyamic acid repeating units including a repeating unit of the following Chemical Formula 3; and
   0.1% to 20% by weight, based on the total weight of the liquid crystal aligning agent composition, of a urea-based compound of the following Chemical Formula 1:

[Chemical Formula 1]

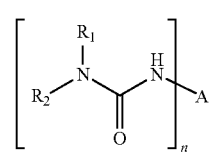

wherein in Chemical Formula 1:

A is a divalent to tetravalent functional group that is any one of an arylene group having 6 to 30 carbon atoms, an alkylene group having 1 to 20 carbon atoms, and an alkylene bisarylene group having 7 to 40 carbon atoms;

n is an integer from 2 to 4; and one of $R_1$ and $R_2$ is a hydroxyalkyl group having 1 to 20 carbon atoms, and the other is hydrogen, a hydroxyalkyl group having 1 to 20 carbon atoms, an alkyl group having 1 to 20 carbon atoms, or an aryl group having 6 to 20 carbon atoms:

[Chemical Formula 3]

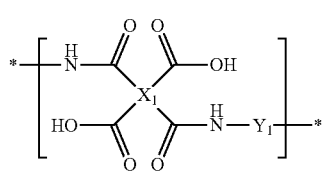

wherein in Chemical Formula 3:

$X_1$ is a tetravalent organic group of the following Chemical Formula 10:

[Chemica Formula 10]

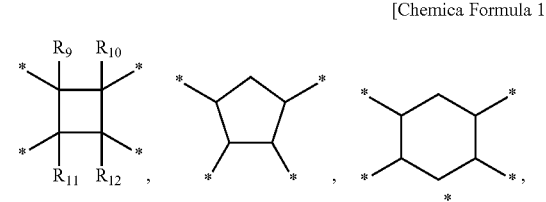

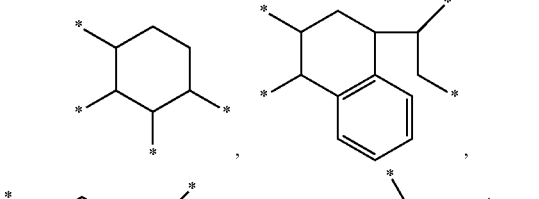

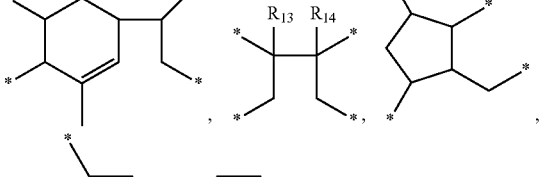

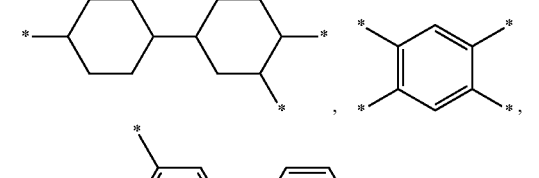

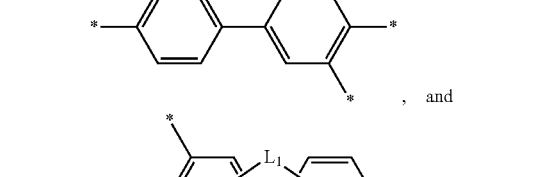

, and

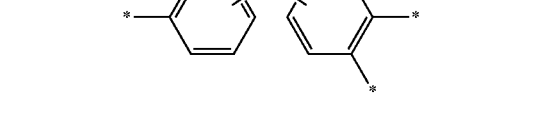

wherein in Chemical Formula 10:

$R_9$ to $R_{14}$ are each independently hydrogen or an alkyl group having 1 to 6 carbon atoms;

$L_1$ is any one selected from the group consisting of —O—, —CO—, —COO—, —S—, —SO—, —$SO_2$—, —$CR_{15}R_{16}$—, —$(CH_2)_t$—, —$O(CH_2)_tO$—, —$COO(CH_2)_tOCO$—, —CONH—, phenylene, and a combination thereof;

$R_{15}$ and $R_{16}$ are each independently hydrogen or an alkyl group or haloalkylhd group having 1 to 10 carbon atoms; and t is an integer from 1 to 10; and $Y_1$ is a divalent organic group of the following Chemical Formula 6 or Chemical Formula 8-2:

[Chemical Formula 6]

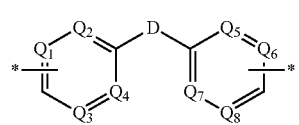

wherein in Chemical Formula 6:

(1) among $Q_1$ to $Q_8$, one of $Q_2$, $Q_4$, $Q_5$ and $Q_7$ is nitrogen and the rest are carbons; D is —NR'—; and R' is hydrogen or an alkyl group having 1 to 6 carbon atoms, or (2) among $Q_1$ to $Q_8$, at least one of $Q_2$, $Q_4$, $Q_5$ and $Q_7$ is nitrogen and the rest are carbons; and D is —O—,

[Chemical Formula 8-2]

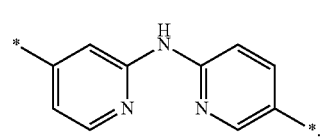

2. The liquid crystal aligning agent composition of claim 1, wherein A is a divalent functional group and n is 2.

3. The liquid crystal aligning agent composition of claim 1, wherein the urea-based compound of Chemical Formula 1 is a compound of the following Chemical Formula 2:

[Chemical Formula 2]

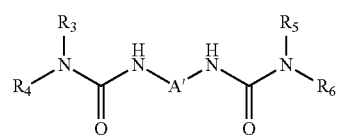

wherein in Chemical Formula 2:

A' is any one of an arylene group having 6 to 30 carbon atoms, an alkylene group having 1 to 20 carbon atoms, and an alkylene bisarylene group having 7 to 40 carbon atoms;

one of $R_3$ and $R_4$ is a hydroxyalkyl group having 1 to 20 carbon atoms, and the other is one of hydrogen, a hydroxyalkyl group having 1 to 20 carbon atoms, an alkyl group having 1 to 20 carbon atoms, and an aryl group having 6 to 20 carbon atoms; and one of $R_5$ and $R_6$ is a hydroxyalkyl group having 1 to 20 carbon atoms, and the other is one of hydrogen, a hydroxyalkyl group having 1 to 20 carbon atoms, an alkyl group having 1 to 20 carbon atoms, and an aryl group having 6 to 20 carbon atoms.

4. The liquid crystal aligning agent composition of claim 3, wherein the urea-based compound of Chemical Formula 2 is selected from the group consisting of a compound of the following Chemical Formula 2-1, a compound of the following Chemical Formula 2-2, a compound of the following Chemical Formula 2-3, a compound of the following Chemical Formula 2-4, a compound of the following Chemical Formula 2-5, and a compound of the following Chemical Formula 2-6:

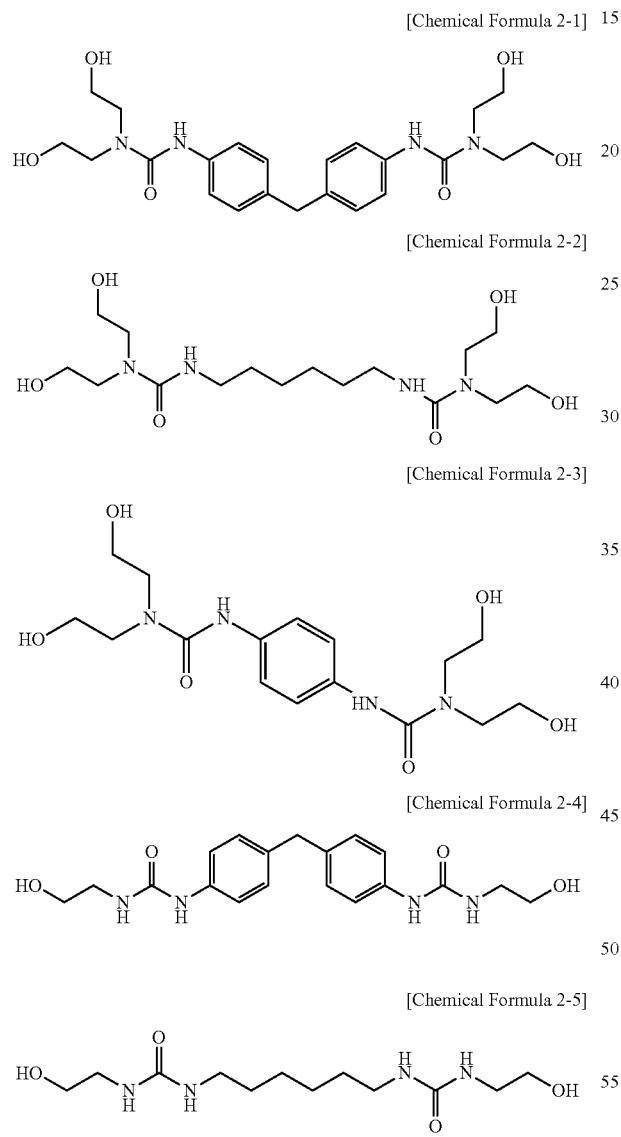

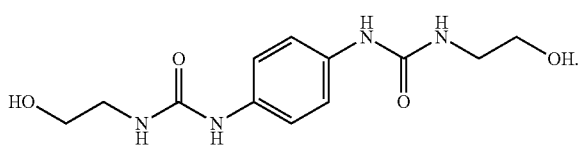

5. The liquid crystal aligning agent composition of claim 1, wherein the urea-based compound of Chemical Formula 1 is contained in an amount of 1% to 5%, by weight based on the total weight of the liquid crystal aligning agent composition.

6. The liquid crystal aligning agent composition of claim 1, wherein the divalent organic group of Chemical Formula 6 is a divalent organic group of the following Chemical Formula 7 or a divalent organic group of the following Chemical Formula 9:

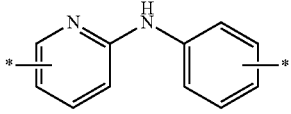

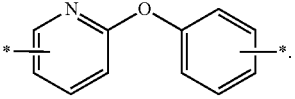

7. A liquid crystal alignment film comprising an aligned cured product of the liquid crystal aligning agent composition of claim 1.

8. A liquid crystal display device comprising the liquid crystal alignment film of claim 7.

9. A method for preparing a liquid crystal alignment film, comprising the steps of:
    coating the liquid crystal aligning agent composition of claim 1, dissolved or dispersed in an organic solvent, onto a substrate to form a coating film;
    drying the coating film;
    irradiating the dried coating film with light or rubbing the coating film to perform alignment treatment; and
    heat treating and curing the alignment-treated coating film.

10. The method of claim 9, wherein the step of drying the coating film is performed at a temperature of 50° C. to 150° C.

11. The method of claim 9, wherein the step of heat treating and curing the alignment-treated coating film is performed at a temperature of 180° C. to 300° C.

12. The method of claim 9, wherein the step of heat-treating and curing the alignment-treated coating film is performed at a temperature of 200° C. to 300° C.

13. A liquid crystal alignment film, prepared by the method of claim 9.

* * * * *